United States Patent
Jouard et al.

(10) Patent No.: US 10,859,853 B2
(45) Date of Patent: Dec. 8, 2020

(54) ELECTRONIC FRAMES

(71) Applicant: Essilor International, Charenton-le-Pont (FR)

(72) Inventors: Ludovic Jouard, Charenton le Pont (FR); Eric Patin, Ugine (FR)

(73) Assignee: Essilor International, Charenton-le-Pont (FR)

( * ) Notice: Subject to any disclaimer, the term of this patent is extended or adjusted under 35 U.S.C. 154(b) by 444 days.

(21) Appl. No.: 15/762,768

(22) PCT Filed: Sep. 8, 2016

(86) PCT No.: PCT/FR2016/052244
§ 371 (c)(1),
(2) Date: Mar. 23, 2018

(87) PCT Pub. No.: WO2017/051092
PCT Pub. Date: Mar. 30, 2017

(65) Prior Publication Data
US 2019/0235274 A1    Aug. 1, 2019

(30) Foreign Application Priority Data

Sep. 24, 2015 (EP) .................................... 15306487

(51) Int. Cl.
*G02C 5/22* (2006.01)
*G02C 11/00* (2006.01)

(52) U.S. Cl.
CPC ......... *G02C 5/2209* (2013.01); *G02C 5/2272* (2013.01); *G02C 11/10* (2013.01)

(58) Field of Classification Search
CPC ..... G02C 5/2209; G02C 5/2272; G02C 11/10
See application file for complete search history.

(56) References Cited

U.S. PATENT DOCUMENTS

| | | |
|---|---|---|
| 6,168,341 B1 | 1/2001 | Chene et al. |
| 2008/0013041 A1 | 1/2008 | Chou |
| 2014/0028966 A1 | 1/2014 | Blum et al. |
| 2015/0128380 A1 | 5/2015 | Buchegger |

FOREIGN PATENT DOCUMENTS

| | | |
|---|---|---|
| CN | 104335102 A | 2/2015 |
| FR | 1180905 A | 6/1959 |
| WO | 97/35085 A1 | 9/1997 |
| WO | 01/35159 A1 | 5/2001 |
| WO | 2013/188805 A2 | 12/2013 |

OTHER PUBLICATIONS

International Search Report dated Nov. 25, 2016 in PCT/FR2016/052244 filed Sep. 8, 2016.
Office Action dated Aug. 15, 2019 in corresponding Chinese Patent Application No. 201680055110.5, 5 pages.

*Primary Examiner* — Wen Huang
(74) *Attorney, Agent, or Firm* — Oblon, McClelland, Maier & Neustadt, L.L.P.

(57) ABSTRACT

An electronic frame including: a surface element configured to house at least one lens; at least one sidepiece having an end that is connected to the surface element by a hinge having a hinge axis; a conductor configured to bend and that extends between the surface element and the at least one sidepiece in the region of the hinge; at least one body positioned between the surface element and an end of the at least one sidepiece, the body being movably mounted in the electronic frames and including a through-opening to allow the conductor to pass through.

13 Claims, 4 Drawing Sheets

ELECTRONIC FRAMES

It may be a question, by way of nonlimiting example, of a frame including electronic components with conventional contact lenses, variable-amplitude ophthalmic-cell lenses the amplitude of which is controlled via an electronic circuit, or indeed with simple lenses, whether tinted or not.

It may also be a question of a frame including electronic components and a single lens, taking the form of goggles or a mask for example, able to be placed in front of both eyes of the wearer of the electronic frame.

Such an electronic frame usually includes a front element intended to house at least one lens, and two temples each having an end joined to said front element by a hinge having a hinge axis defining an axial direction, said frame including a conductor, which is able to curve, that extends between the front element and at least one of said temples in the vicinity of said hinge.

The term "conductor" will be understood to mean any element allowing information or energy, for example small amounts of electrical energy, to be transmitted. Such elements are for example electrical wires, cables, flexible strips bearing a layer of conductive material, etc.

Many technical solutions exist for passing such a conductor through a hinge in particular in the field of telephony (clamshell phones) or electronic glasses.

However, these solutions remain unsatisfactory with regard to application to electronic frames because these solutions are expensive, or unattractive, or quite simply incompatible with the production of electronic frames because the lifetime of these technical solutions is limited, or indeed because implementation of these technical solutions is constrained. In addition, these solutions are generally not compatible with the need to achieve transmission via a conductor in a limited space.

The invention allows this problem to be solved while allowing a conventional spectacle-frame look to be preserved and while protecting the conductor.

It provides, to this end, an electronic frame including a front element intended to house at least one lens, and at least one temple having an end joined to said front element by a hinge having a hinge axis, said electronic frame including a conductor, which is able to curve, that extends between the front element and said at least one temple in the vicinity of said hinge. The electronic frame according to the invention is noteworthy in that it includes at least one body placed between the front element and one end of said at least one temple, said body being movably mounted in said electronic frame and having a through aperture apt to let said conductor pass.

The body passed through by the conductor allows it to be protected: specifically, the body prevents any contact of the conductor with a foreign body that could cause it to deteriorate. The body also hides the conductor, thereby allowing the attractiveness of the hinge, and therefore of the electronic frame, to be guaranteed.

The invention may also include the following features, separately or in combination:

said body may be movably mounted so as to be able to rotate about the hinge axis, the hinge axis defining an axial direction, and the through aperture being in a radial plane perpendicular to the axial direction;

said end of at least one of said two temples may have a zone for guiding the conductor, and a first section for receiving a portion of said body, said first receiving section having a shape allowing said body to be guided in rotation;

the front element may include, in the vicinity of the hinge, a zone for guiding the conductor, and a second section for receiving a portion of said body, said second receiving section having a shape allowing said body to be guided in rotation;

the hinge allowing the temple to move between an open position and a closed position, said receiving sections may mask the conductor and the aperture of said body in any position of said temple between said open position and said closed position and in said open and closed positions of said temple;

said body may advantageously be of cylindrical shape;

the first and second receiving sections may be at least partially cylindrical sections;

said through aperture may have a shape allowing a minimum radius of curvature of the conductor to be constrained;

said shape of said aperture may be a half-hourglass shape, said aperture having a cross section that increases from a center of the body to two ends of the through aperture of the body;

said shape of said aperture may be an hourglass shape, said aperture having a cross section that increases from a center of the body to two ends of the through aperture of the body;

the frame may have a first length between one end of the front element in the vicinity of the hinge and one end of said temple and the conductor may have a second length between said end of the front element and said end of said temple, said second length being substantially 1 to 5% larger than said first length;

the hinge may allow the temple to move between an open position and a closed position; said through aperture may include two internal walls that face each other; and, in said open or closed position of the temple, the conductor may make contact with one or other of said two internal walls of said aperture;

the hinge may allow the temple to move between an open position and a closed position and, between said open position and said closed position, said body does not exert a tensile stress on said conductor;

said body may include first stopping elements able to make contact with second stopping elements with which said end of at least one of said two temples and/or one end of said front element is provided, said first and second stopping elements ensuring the rotation of said body about said hinge axis;

said hinge may link the end of at least one of said two temples to said front element and said body may be distinct from said hinge;

according to one variant embodiment, said body may be a portion of the hinge linking the end of at least one of said two temples to said front element;

the hinge may have an opening angle comprised between substantially −10° and +90°, the conductor may have a radius of curvature larger than 2.5 mm;

the body may have a cross section having a length substantially of 4 mm, said length being measured between the two most distant points of the cross section, and the body may have a height of substantially 4 mm.

In order to allow it to be implemented, the invention is described in a manner sufficiently clear and complete in the following description that, in addition, is accompanied by drawings in which.

For the sake of clarity, only the elements useful for understanding the embodiments described have been shown.

In addition, from one embodiment to the next, references designating a given element have been reused.

Lastly, in the following description, the terms "lower", "upper", "top", "bottom" etc. are used with reference to the drawings for the sake of facilitating comprehension. They must not be understood to be limitations on the scope of the invention.

Figure 9:
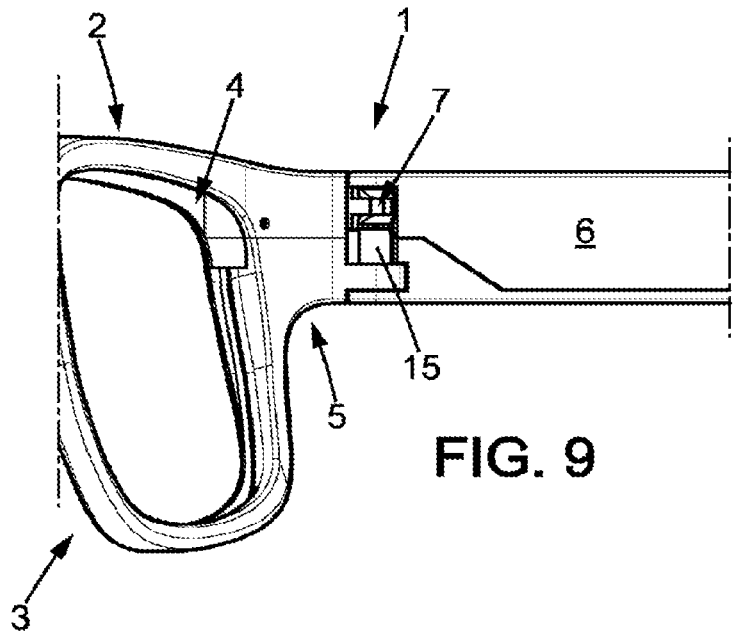
FIG. 9 is a partial perspective view of an electronic frame according to the invention.
Figure 10:
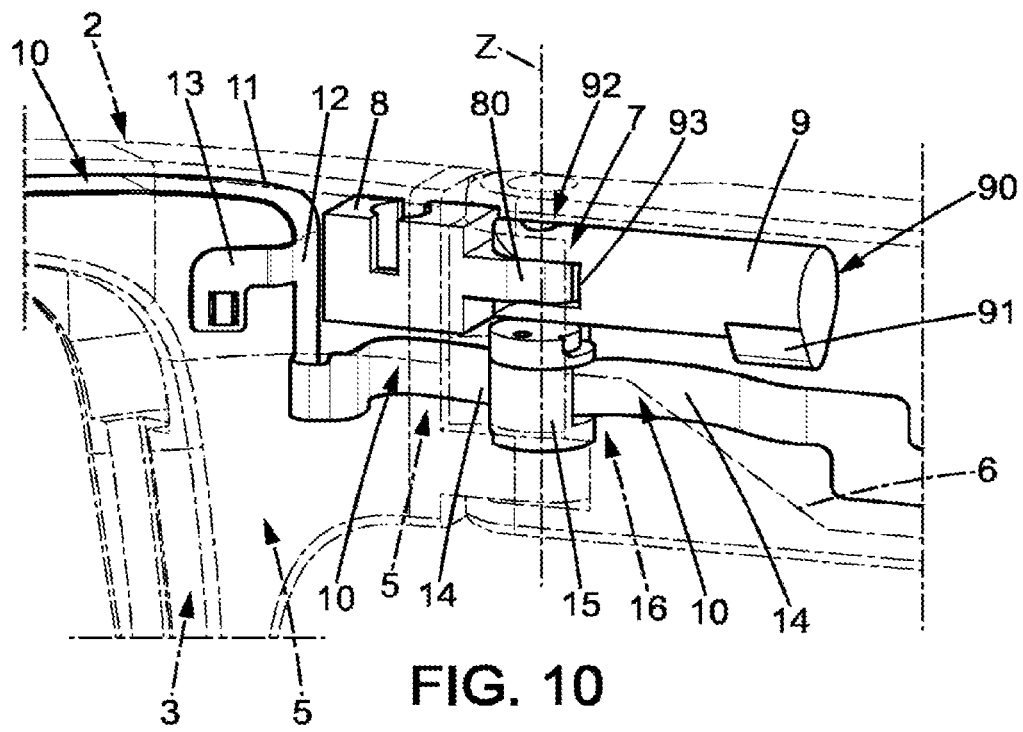
FIG. 10 is an enlargement of a partially cutaway, partial perspective view of the electronic frame illustrated in FIG. 9.

FIGS. 9 and 10 partially illustrate an electronic frame 1 according to the invention, which includes a front element 2, i.e. an element of the frame that is suitable for being positioned in front of the face of a wearer of the electronic frame 1.

The front element 2 is designed to house at least one lens (not shown). It includes to this end a rim 3 having at least one internal groove 4 that is able to receive an edge of a lens.

In the example illustrated in the figures, the electronic frame 1 is designed to receive two lenses (even though a single rim 3 is illustrated) but it will be understood that the invention is not limited to an electronic frame 1 designed to receive two lenses. Specifically, the electronic frame according to the invention could be designed to receive only one goggles- or mask-type lens, without departing from the context of the invention, the goggles- or mask-type lens being sufficiently large to reach in front of both eyes of a wearer when the electronic frame is being worn.

The lenses may be active lenses. By active lens what is meant is a lens that is associated with an electronic component allowing its state to be changed when the electronic component is activated.

For example, the active lenses may be variable-amplitude ophthalmic cells the amplitude of which is controlled by an electronic circuit, or phase-modulation lenses or smart lenses.

It should be understood that the invention is not limited to an optical device including an electronic frame equipped with active lenses. Specifically, a device including an electronic frame according to the invention may be equipped with passive lenses, i.e. lenses that may (or may not) have optical properties but that are not designed to change state (under the control of an electronic component, for example).

For example, it may be envisioned to use passive lenses, and in this case the conductor may be used to connect components of at least one of the temples to components housed in the front element.

According to yet another embodiment, the conductor could pass through the front element and join components housed in a temple to components housed in the other temple.

The front element 2 is joined, by its lateral ends 5, to two temples 6, the two temples 6 being designed to be positioned above the ears of a wearer of the frame.

A hinge 7 joins each temple 6 to a lateral end of the front element.

The hinge 7 allows the temple 6 to move between:
an open position (shown in FIGS. 9 and 10) in which the temple 6 is away from the front element 2 and lies in a plane that is substantially perpendicular to the plane in which the front element lies; and
a closed position in which the temple 6 is close to the front element 2 and lies in a plane that is substantially parallel to the plane in which the front element lies.

The hinge 7 is more particularly shown in FIG. 10.

It includes a base 8, which is fastened to the rim 3 of the front element 2, at the lateral end 5. The base 8 is of substantially parallelepipedal shape, including four lateral faces, an upper face and a lower face. The base 8 has, on one of its lateral faces, a protrusion 80 the length of which is substantially equal to the length of the base 8 of the hinge.

The protrusion 80 is substantially of rectangular cross section and allows the base 8 of the hinge to be joined to an arm 9 of the hinge 7.

The arm 9 of the hinge 7 is fastened to the temple 6.

The arm 9 of the hinge 7 has a generally cylindrical shape, comprising a first end 90 endowed with a radial protrusion 91 and a second end 92 having an axial notch 93 that is able to receive at least partially the protrusion 80 of the base 8 of the hinge.

The protrusion 80 and the second end 92 of the arm 9 each include a through aperture. The through apertures are positioned one above the other, coaxially, so as to make it possible to insert therein a retaining part (a rivet for example) and thus assemble the protrusion 80 and the end 92 of the arm 9 of the hinge.

The arm 9 of the hinge 7 is movably mounted so as to be able to rotate about the retaining part (pivot), and the hinge 7 has an axis of rotation Z that corresponds to the axis of the retaining part about which the arm 9 may pivot.

According to the invention, the electronic frame 1 includes at least one electronic component.

In the case of the present example, it includes at least three electronic components: a first component (not shown) located in the front element 2, a second component (not shown) located in the temple 6 and a third component, namely a conductor 10, that allows the first component and the second component to be physically connected.

As indicated above, the conductor ensures the passage of a current between the first component and the second component.

The conductor 10 is in particular illustrated in FIG. 10. It takes the form of a ribbon that is flexible (and therefore able to curve) bearing a conductive circuit, of the printed-circuit type, allowing the components with which the circuit makes contact to be connected.

Although the described and illustrated invention employs a conductive ribbon 10, it should be understood that the invention is not limited thereto.

Specifically, the conductor could be different: it could be a question of a cable, a wire, an optical fiber or any other element allowing information or energy to be transmitted between two electronic components physically connected thereby, one component being located in the front element and the other being located in the temple of the electronic frame 1.

The conductive ribbon 10 includes a first portion 11 that extends, in the front element 2, to the lateral end 5 of the front element.

Level with the lateral end 5, the first portion 11 of the ribbon 10 curves to meet a second ribbon portion 12. The second ribbon portion includes a ribbon arm 13, allowing it to be connected to an electronic component (not shown).

The end of the second ribbon portion 12 curves again to meet a third ribbon portion 14, which lies parallel to the temple 6. The third ribbon portion 14 is oriented so that its thickness is positioned in the thickness of the temple 6.

The conductive ribbon 10 extends, in this way, between the front element 2 of the frame and a temple 6 of the frame.

The conductive ribbon 10 is positioned in the vicinity of the hinge, under the hinge 7.

The conductive ribbon 10 passes through a body 15 positioned under the hinge, between the lateral end 5 of the front element 2 and the end of the temple 6.

Thus, in this embodiment, the body 15 is produced separately from the hinge 7. It will however be understood that the invention could also relate to an embodiment in which the hinge includes the body 15 (in other words, an embodiment in which the body 15 belongs to the hinge).

The body 15 may be made from a material having low coefficients of friction with the materials from which the front element or temple 6 are made. For example, the body 15 may be made of Teflon®, of Delrin®, of bronze, etc.

The function of the body 15 is to protect the conductive ribbon 10 by keeping it a distance from the hinge 7, to guide it between the front element 2 and the end of the temple 6 and to hide the conductive ribbon 10 from the exterior of the electronic frame 2 in order to physically protect it and for aesthetic reasons.

Reference will now be made to FIGS. 1 to 8 in order to describe the body 15.

The body 15 is a cylinder, having a cross-section the length of which is substantially 4 mm and a height of substantially 4 mm.

The body 15 is placed in the frame such that its axis coincides with the axis Z of the hinge and it is movably mounted so as to be able to rotate about its axis.

In order to allow this rotation, the ends 5 and 16, of the front element 5 and of the temple 6, respectively, have receiving sections (or housings) 17 and 18, respectively, each able to house a portion of the body 15.

The two receiving sections 17 and 18 are designed in order to allow the body 15 to be guided in rotation.

To do this, the receiving sections 17 and 18 each have a partially cylindrical shape that is complementary to the shape of the body 15.

The body 15 has a through aperture 19 that is apt to let the conductive ribbon 10 pass.

To achieve this, the through aperture 19 is produced in a radial plane that is perpendicular to the axial direction in which the axis of the cylindrical body 15 is oriented. The through aperture thus allows a conductor that preferably lies in a plane that is on the whole perpendicular to the axial direction to be used. In particular, preferably, the conductor includes no crease or abrupt change in direction along the length of this aperture in an axial direction.

The through aperture 19 has a quite particular shape, which allows a minimum radius of curvature of the conductive ribbon 10 to be constrained.

Figure 1:
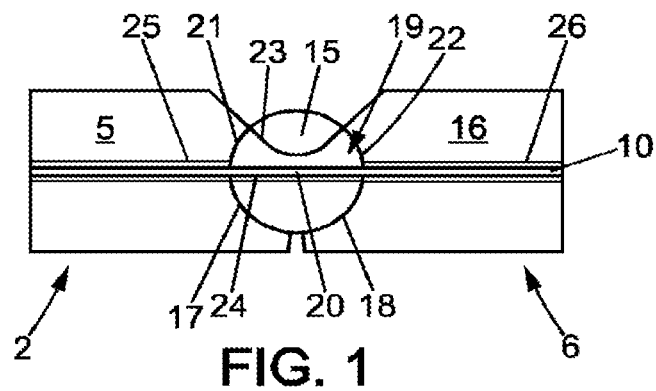
FIG. 1 is a schematic cross-sectional view of a temple end and of an end of a front element of an electronic frame according to a first embodiment according to the invention, a movable body being positioned between said ends, the assembly being shown in the open position of the temple.
Figure 2:
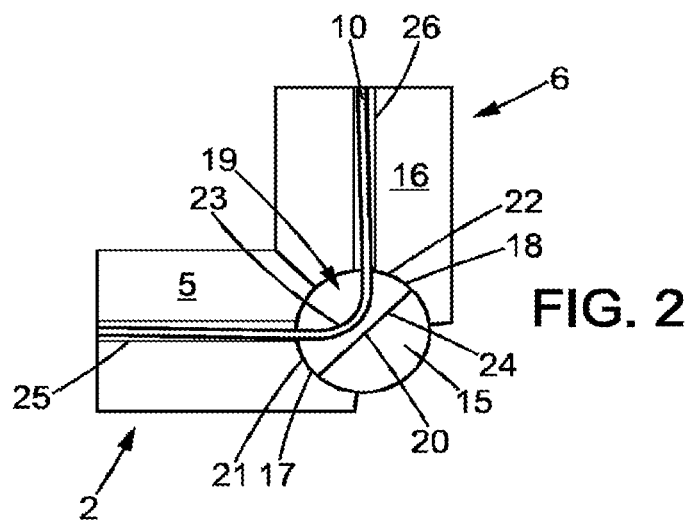
FIG. 2 is a schematic cross-sectional view, showing the temple end, the end of the front element and the movable body of FIG. 1, the assembly being shown in the closed position of the temple.

In the first embodiment illustrated in FIGS. 1 and 2, the through aperture 19 has a half-hourglass shape: the aperture has a cross-section that increases between a center 20 of the body 15 and two ends 21 and 22 of the through aperture 19.

The through aperture 19 has two internal walls 23 and 24 that face each other.

The wall 24 is planar whereas the wall 23 is curved.

In the second embodiment illustrated in FIGS. 3 to 8, the through aperture 19 has an hourglass shape and the two internal walls, which face each other, are two curved walls 23 that are symmetric with respect to a median plane of the body 15.

The hourglass shape means that the second through aperture 19 has a cross-section that enlarges from the center 20 of the body 15 to the two ends 21 and 22 of the through aperture 19.

Figure 3:
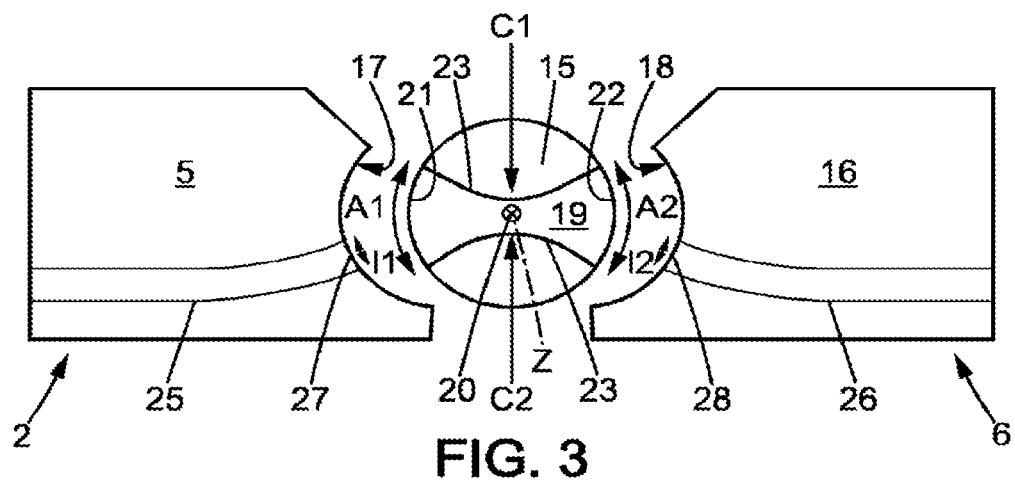
FIG. 3 is an exploded schematic cross-sectional view, showing a temple end, an end of the front element and a movable body that is different from that shown in FIGS. 1 and 2.

FIG. 3 shows an enlargement of the body 15. The ends 21 and 22 of the through aperture 19 have opening angles A1 and A2.

Moreover, the curved walls 23 have an internal convexity C1 and C2 that is relatively pronounced.

Each end 5 and 16 of the front element 2 and the temple 6, respectively, has a guiding duct 25 and 26, through each of which one portion of the conductive ribbon 10 is guided.

The guiding ducts 25 and 26 have open ends 27 and 28, respectively, that open onto the receiving sections 17 and 28, respectively, of the ends 5 and 16 of the front element 2 and of the temple 6. The ducts 25 and 26 are here shown to be a constant width, but could also be flared. It is important that no matter how open the hinge is, the parameters I1, I2, A1 and A2 are dimensioned such that there is always a zone of overlap between the ends 27 and 21, on the one hand, and the ends 28 and 22, on the other hand.

The guiding ducts 25 and 26 define zones for guiding the conductive ribbon 10 to a given location of the receiving sections 17 and 18. The guiding zones extend over a width I1 and I2, respectively in the receiving sections 17 and 18 of the ends 5 and 16 of the front element 2 and of the temple 6.

Adjustment of the parameters A1, A2, I1, I2 and C1, C2, in particular, allows at least one of the following characteristics of the electronic frame 1 to be influenced:
 the radius of curvature of the conductive ribbon 10;
 the length of the path traversed by the conductive ribbon 10 between the ends 27 and 28 (on this length depends the tensile or compressive stress on the conductive ribbon);

how and to what extent the conductive ribbon 10 is blocked on either side of the hinge 7 in order to achieve seal tightness; and the opening angle of the temple 6.

Thus, it is possible to produce an electronic frame so that the receiving sections 17 and 18 mask the conductive ribbon 10 and the ends 21 and 22 of the through aperture 19 in any position taken by the temple 6 between its open position and its closed position, and in the open position or the closed position of the temple 6.

Provision may also be made for the parameters A1, A2, I1, I2 and C1, C2 to be such that, between the open position and the closed position of the temple (or vice versa), the body 15 does not exert a tensile stress on the conductive ribbon 10.

Figure 4:
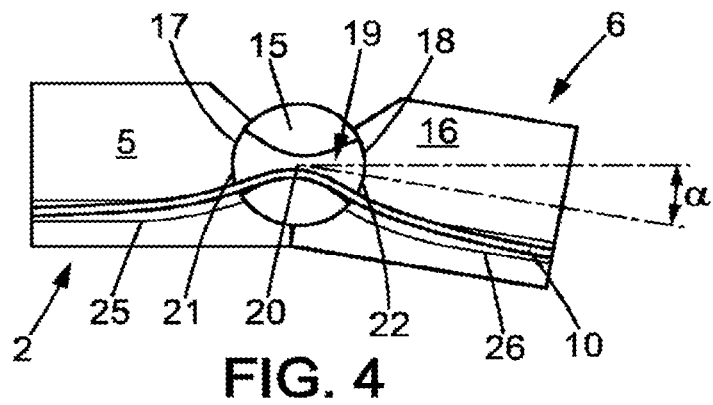
FIG. 4 is a schematic cross-sectional view of a temple end and of an end of a front element of an electronic frame according to a second embodiment according to the invention, a movable body being positioned between said ends, the assembly being shown in an open and constrained position of the temple.
Figure 5:
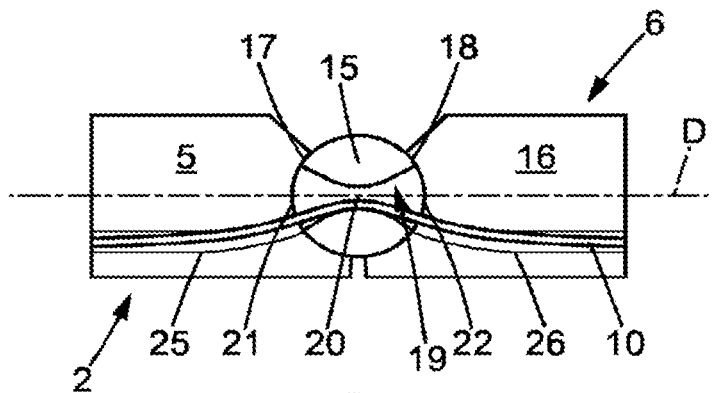
FIG. 5 is a schematic cross-sectional view, showing the temple and front-element ends and the movable body that are shown in FIG. 4, the assembly being shown in an open and unconstrained position of the temple.
Figure 6:
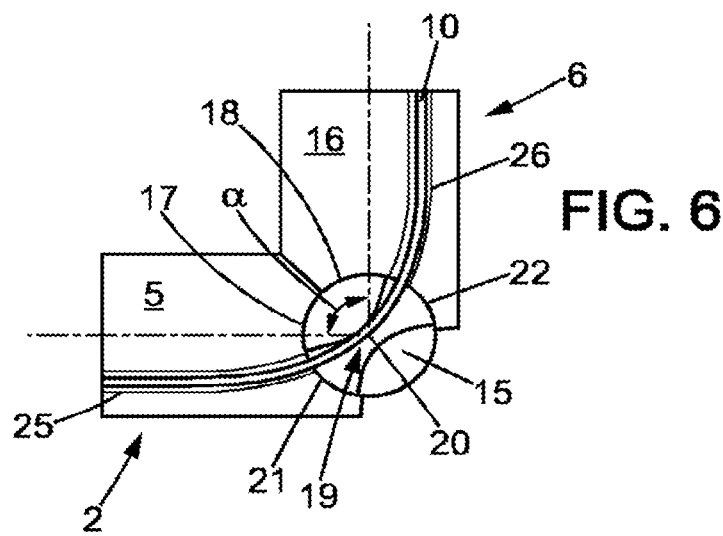
FIG. 6 is a schematic cross-sectional view, showing the temple end, the end of the front element and the movable body of FIG. 4, the assembly being shown in the closed position of the temple.

FIGS. 4 to 6 illustrate three positions taken by the temple 6 and allowed by a choice of the parameters A2, I1, I2 and C1, C2.

FIG. 4 shows the temple 6 in an open position that is constrained with respect to the front element 2: it is a question of the position taken by the temple 6 when a wearer separates the temples 6 of a frame in order to position the front of the electronic frame in front of his face and to place the temples 6 above his ears. The position is said to be "constrained" because it is imposed by a force exerted by the wearer to separate the temples 6.

The angle α taken by the temple 6 in the open and constrained position is −10° with respect to the open and unconstrained position of the temple 6.

The open and unconstrained position of the temple 6 is illustrated in FIG. 5. It will be noted that, in this position, the end 5 of the front element 2 and the end 16 of the temple 6 are aligned in a straight line D.

The closed position of the temple 6 is illustrated in FIG. 6: it is a question of the position taken by the temple 6 when the wearer folds the temple 6 against the front element, when he is not wearing the electronic frame and wishes to put it in a case, for example.

The angle α between the direction taken by the temple 6 and the direction D of the front element is substantially 90°.

Thus, the hinge has an opening angle comprised substantially between −10° and 90°.

With regard to the dimensions of the body 15 (which were mentioned above), the conductive ribbon 10 must have a radius of curvature larger than 2.5 mm in order not to be stressed in any of the positions taken by the temple 6.

More generally, a path length over which the conductive ribbon 10 runs between the ends 5 and 16 of the front element 2 and the temple 6 will be considered, the path length being measured between the ends 27 and 28 of the ducts 25 and 26, respectively. Provision is made for the length of the conductive ribbon 10 between these two ends 27 and 28 to be substantially 1 to 5% larger than the path length in order to prevent any stress being exerted on the conductive ribbon 10.

It will be noted that, depending on whether the temple is in the open position (whether constrained or not) or in the closed position, the conductive ribbon makes contact with one or other of the internal walls 23 of the through aperture 19: in the open (or separated) position of the temple, which is shown in FIG. 4 or 5 (illustrating the constrained and unconstrained positions, respectively), the conductive ribbon 10 makes contact with a wall 23 (the lower wall 23 in FIGS. 4 and 5). In the closed (or folded away) position of the temple 6 (see FIG. 6), the conductive ribbon is positioned against the other wall 23 of the through aperture 19 (the upper internal wall in FIG. 6).

In the examples described above, it is the conductive ribbon 10 that, bearing against one or other of the internal walls of the through aperture, drives the body to rotate.

Figure 7:
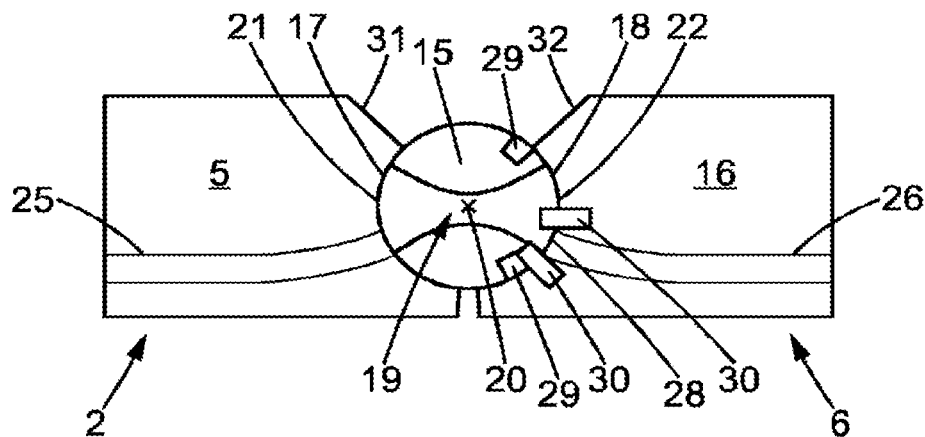
FIG. 7 is a schematic cross-sectional view of a temple end and of an end of a front element of an electronic frame according to a third embodiment according to the invention, a movable body being positioned between said ends, the assembly being shown in the open position of the temple.
Figure 8:
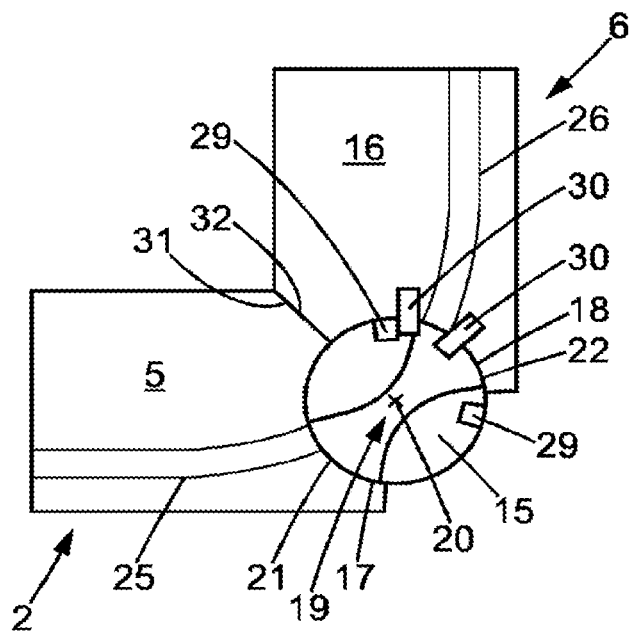
FIG. 8 is a schematic cross-sectional view, showing the temple and front-element ends and the movable body that are shown in FIG. 7, the assembly being shown in the closed position of the temple.

Provision could be made for other technical solutions: FIGS. 7 and 8 shows one technical solution in which provision is made to position elements forming stops both on the body 15 and on one of the ends of the front element or temple.

The stop-forming elements serve to drive the body 15 to rotate during the pivot of the temple 6.

In the examples illustrated in FIGS. 7 and 8, the body 15 has two stops 29, protruding from an upper or lower surface of the cylindrical body 15, one of the stops 29 being located in the vicinity of the lower portion of the end 22 of the aperture 19, and the other of the stops 29 being located in the vicinity of the upper portion of the end 22 of the aperture 19.

The end 16 of the temple 6 also has two protruding stops 30, located on either side of the end 28 of the duct 26 of the temple 6.

During closure (or folding down) of the temple 6 with respect to the front element 2 (FIG. 8), the stop 30 located in the upper portion of the open end 28 positions itself against the upper stop 29 of the body 15. The stop 30 then pushes on the stop 29 which drives the body 15 to rotate. The rotation of the body 15 stops when two portions 31 and 32 of the two ends 5 and 16 of the temples make contact with each other.

During opening (or separation) of the temple 6 with respect to the front element 2 (FIG. 7), the stop 30 located in the lower portion of the open end 28 positions itself against the lower stop 29 of the body 15. The stop 30 then pushes on the stop 29 which drives the body 15 to rotate during the passage of the temple 6 from its closed (or folded down) position to its open (or separated—see FIG. 7) position.

From the above description it will be understood how the invention allows a conductive element of the flexible-conductive-ribbon type to be hidden in a hinge of an electronic frame.

It should however be understood that the scope of the invention is not limited to the embodiments specifically described above and that it encompasses the implementation of any equivalent means.

The invention claimed is:

1. An electronic frame comprising:
a front element configured to house at least one lens; and
at least one temple having an end joint to the front element by a hinge having a hinge axis;
a conductor, configured to curve, that extends between the front element and the at least one temple in the vicinity of the hinge; and
at least one body placed between the front element and the one end of the at least one temple, the body being movably mounted in the electronic frame and including a through aperture configured to let the conductor pass, wherein the end of the at least one temple includes a zone for guiding the conductor, and a first section for receiving a portion of the body, the first receiving section having a shape allowing the body to be guided in rotation; and
wherein the hinge allows the at least one temple to move between an open position and a closed position, and the receiving section masks the conductor and the through aperture of the body in any position of the at least one temple between the open position and the closed position and in the open and closed positions of the at least one temple.

2. The electronic frame as claimed in claim 1, wherein the hinge axis defines an axial direction, the body is movably mounted to be able to rotate about the hinge axis, and the through aperture is in a radial plane perpendicular to the axial direction.

3. The electronic frame as claimed in claim 1, wherein the front element includes, in vicinity of the hinge, a zone for guiding the conductor, and a second section for receiving a portion of the body, the second receiving section having a shape allowing the body to be guided in rotation.

4. The frame as claimed in claim 1, wherein the body is of substantially cylindrical shape.

5. The frame as claimed in claim 1, wherein the through aperture has a shape allowing a minimum radius of curvature of the conductor to be constrained.

6. The frame as claimed in claim 5, wherein the shape of the aperture is a half-hourglass shape, the aperture having a cross section that increases from a center of the body to two ends of the through aperture of the body.

7. The frame as claimed in claim 5, wherein the shape of the aperture is an hourglass shape, the aperture having a cross section that increases from a center of the body to two ends of the through aperture of the body.

8. The frame as claimed in claim 1, having a first length between one end of the front element in vicinity of the hinge and one end of the temple, wherein the conductor has a second length between the end of the front element and the end of the temple, and the second length is substantially 1 to 5% larger than the first length.

9. The frame as claimed in claim 1, wherein the hinge allows the temple to move between an open position and a closed position, the through aperture includes two internal walls that face each other and, in the open or closed position of the temple, the conductor makes contact with one or other of the two internal walls of the through aperture.

10. The frame as claimed in claim 1, wherein the hinge allows the temple to move between an open position and a closed position and, between the open position and the closed position, the body does not exert a tensile stress on the conductor.

11. The frame as claimed in claim 1, wherein the body includes first stopping elements configured to make contact with second stopping elements with which the end of the at least one temple and/or one end of the front element is provided, the first and second stopping elements ensuring the rotation of the body about the hinge axis.

12. The frame as claimed in claim 1, wherein the hinge links the end of the at least one temple to the front element and the body is distinct from the hinge.

13. The frame as claimed in claim 1, wherein the body is a portion of the hinge linking the end of the at least one temple to the front element.

* * * * *